UNITED STATES PATENT OFFICE.

MAXIMILIAN TREMBOUR, OF HARZBURG, GERMANY, ASSIGNOR TO PUTNAM DEVELOPMENT COMPANY, A CORPORATION OF NEW YORK.

PROCESS FOR MANUFACTURING CEMENT.

935,617.

Specification of Letters Patent. Patented Sept. 28, 1909.

No Drawing. Application filed October 31, 1907. Serial No. 400,140.

*To all whom it may concern:*

Be it known that I, MAXIMILIAN TREMBOUR, a subject of the German Emperor, and a resident of the city of Harzburg, Brunswick, Germany, have invented a certain new and useful Process for Manufacturing Cement, of which the following is a specification.

This invention relates to the process of manufacturing cement from furnace slag and has for its object to produce a better and more uniform cement than has heretofore been produced from furnace slag.

Nearly all furnace slag contains a certain percentage of sulfur, which varies according to the quality of the ore treated, and coal used in the furnace, and it is necessary to eliminate the sulfur in order to produce cement of good grade and quality.

I remove as far as possible the sulfur from the slag, as follows: I first break up the molten slag into small molten globules by any well known means, and at the same time, while the slag is broken up into small particles, I add acids diluted with water or dilute acid solutions of solid materials, and by this means cause the diluted acid or acid solutions to be intimately mingled with the slag which has been broken up into the molten globules. The acids attack the sulfur and cause it to be thrown off in the form of gas. The amount of acid used I vary according to the percentage of sulfur contained in the slag. I have found however, that a slight excess of acid is not in any way detrimental to the cement produced. Dilute acid has the property of dissolving certain solid substances, as for instance gypsum, and these soluble substances I add to my acid solution before introducing it into the slag. I have also found by my experiments, that when such acid solution is brought into contact with the slag which has been broken up into the small molten globules, that the acid combines therewith and deposits the solid materials which it formerly held in solution in the form of an envelop or coating over each molten globule of slag, and that I can determine the thickness of this envelop or coating over each molten globule of the slag, by the concentration or amount of acid solution which I use, and the amount of solid materials dissolved therein. I have also found that the envelops deposited on the molten globules of cement, prevent them from reuniting into a solid mass when they again come into contact with each other, and leave the slag in a granular condition, in which state it is more easily pulverized or ground than is the case where it is reunited into a solid mass.

I have also found that in order to produce good cement from furnace slag, it is necessary that the slag should be uniformly cooled throughout the mass. I have also found that the rapidity with which the slag is cooled is determined by the thickness of the envelop deposited upon the globules, and that the time required for cooling diminishes as the thickness of the envelop is increased, and increases as the thickness of the envelop is decreased, and that by means of a separation of the globules of cement by the envelops deposited thereon, that I am able to uniformly cool the whole mass of slag, so that the cement will be of substantially uniform quality throughout the mass.

As I can determine the thickness of the envelop by the means stated, I am able to accurately determine the length of time required for cooling the slag, and thereby determine the quality of the cement produced which varies according to the duration of the cooling operation. After the slag, treated as I have described, has been thoroughly cooled, I pulverize or grind it to a fine powder by any well known means, and it is then ready for use.

Having described my process, what I claim as new, and desire to secure by Letters Patent of the United States, is:

1. The process of manufacturing cement from blast furnace slag which consists in adding to the molten slag an acid solution.

2. The process of manufacturing cement from furnace slag, which consists in first breaking up the molten slag into small molten particles, and then adding thereto dilute acid having solid materials dissolved therein in quantities sufficient to form a coating or envelop about the globules of the slag.

3. The process of manufacturing cement from furnace slag which consists in breaking up the molten slag into small particles and then adding thereto, while the slag is in a molten condition and separated into small particles, foreign matter which will
5 cause an envelop to be deposited about the particles of slag.

Signed at New York city, in the county of New York, and State of New York, this 22nd day of October A. D. nineteen hundred and seven.

MAXIMILIAN TREMBOUR.

Witnesses:
OTTO LINN,
DORA BECK.